United States Patent [19]

Schaefer

[11] 4,270,324

[45] Jun. 2, 1981

[54] ASSEMBLY OF WALL ELEMENTS

[76] Inventor: Rudolf Schaefer, Brauerstrasse 35, 4100 Duisburg, Fed. Rep. of Germany

[21] Appl. No.: 956,428

[22] Filed: Oct. 31, 1978

[30] Foreign Application Priority Data

Nov. 8, 1977 [DE] Fed. Rep. of Germany ....... 2749874
Jul. 19, 1978 [DE] Fed. Rep. of Germany ....... 2831652

[51] Int. Cl.³ .............................................. E04B 5/00
[52] U.S. Cl. ....................................... 52/285; 52/284; 52/584; 52/595
[58] Field of Search ................. 52/595, 584, 285, 259, 52/264, 248, 249, 247, 141

[56] References Cited

U.S. PATENT DOCUMENTS

| 885,371 | 4/1908 | Petracchi | 52/248 |
|---|---|---|---|
| 911,217 | 2/1909 | Doty | 52/248 |
| 1,903,881 | 4/1933 | Sander | 52/264 |
| 1,919,780 | 7/1933 | Fairbank | 52/584 |
| 2,162,435 | 6/1939 | Hopkins | 52/141 |
| 2,238,111 | 4/1941 | Hain | 52/248 |
| 2,717,093 | 9/1955 | Mautner | 52/584 |
| 2,793,401 | 5/1957 | Paschke | 52/264 |
| 2,835,955 | 5/1958 | Snyder | 52/141 |
| 3,512,304 | 5/1970 | Meuret | 49/478 |
| 3,898,779 | 8/1975 | Tracy | 52/264 |
| 3,972,163 | 8/1976 | Coperthwaite | 52/248 |

FOREIGN PATENT DOCUMENTS

| 1133494 | 3/1957 | France | 52/595 |
|---|---|---|---|
| 19899 | of 1891 | United Kingdom | 52/264 |

Primary Examiner—Price C. Faw, Jr.
Assistant Examiner—Henry E. Raduazo
Attorney, Agent, or Firm—Spencer & Kaye

[57] ABSTRACT

An assembly comprises a plurality of individual wall elements having connection regions on adjacent wall elements at which these wall elements are to be connected, the connection regions comprising a frustoconical tongue on one element and a co-operating frustoconical groove on the other element, clamping means being provided for holding the wall elements together.

17 Claims, 13 Drawing Figures

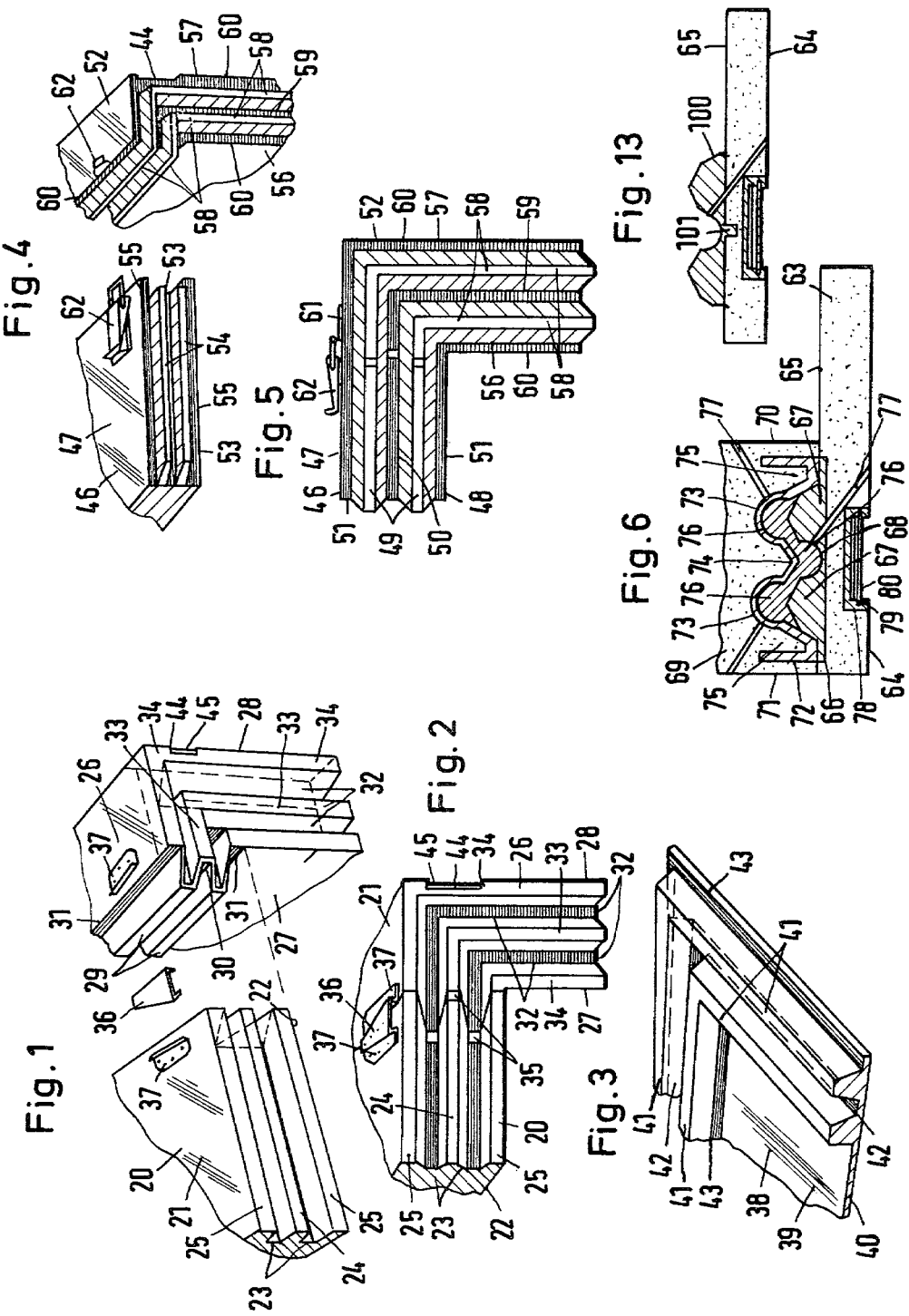

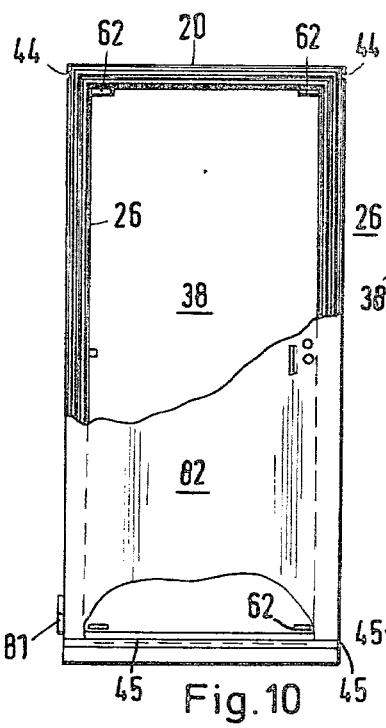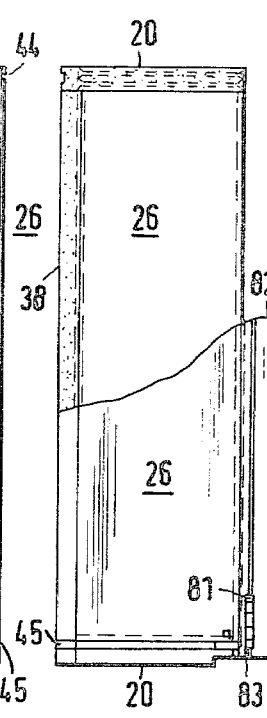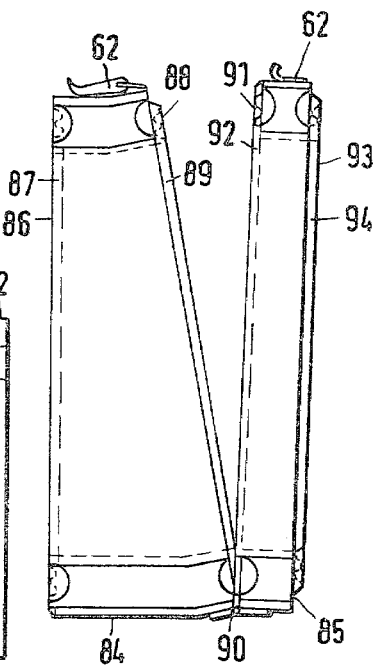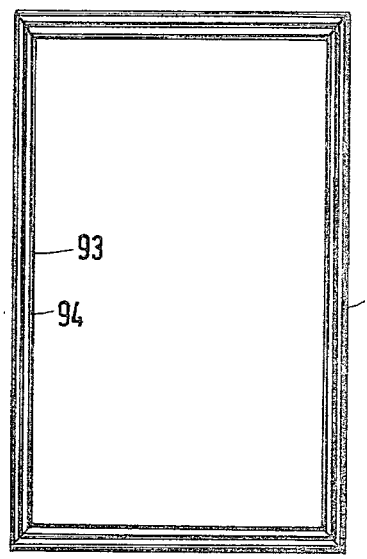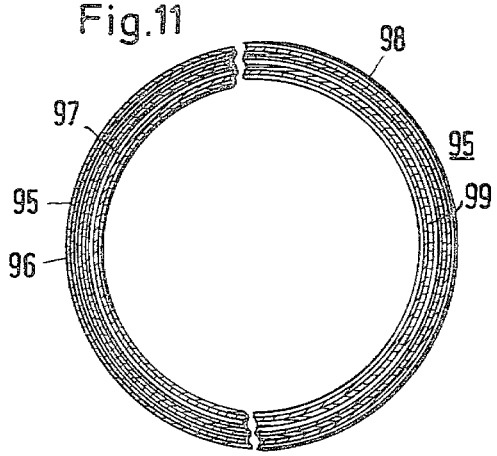

ASSEMBLY OF WALL ELEMENTS

BACKGROUND OF THE INVENTION

The invention relates to an assembly made up of individual wall elements and having tongue and groove connections which are constructed and having clamping elements by means of which the tongue and groove connections can be held together in the direction in which they are connected.

Tongue and groove connections are known in many forms. When making furniture, boxes or containers for example the individual wall elements are provided with tongue and groove connections and are fixed together by addition of glue. The tongues and grooves usually have a rectangular cross-section but sometimes they have a triangular or wedge-shaped cross-section.

The loading which occurs in a direction which runs cross-wise to the longitudinal axis of the tongues and grooves can be accommodated by the grooves and tongues because of their positive interengagement in this direction. However, since, due to inaccuracies in manufacture, the tongues and grooves are never quite so exactly dimensioned that a frictional effect is always present holding the wall elements together, then in addition glueing, screwing etc. must take place if the assembly comprising the wall elements is to be sufficiently stable. Without using additional glue or a screw arrangement, the clamping action would soon weaken even with the most exact manufacture because of material fatigue. Displacement of the tongues and grooves longitudinally would also occur if this were not prevented by glueing or a screw arrangement or by other measures.

The tongue and groove connections previously known for constructing these assemblies have numerous disadvantages, the first of which is that specialised and skilled assembly is always necessary in order to put the wall elements together and, in addition, tools and other aids must be used. The next disadvantage is that the assemblies put together in this way are not sufficiently air or water-tight in the region of the connection between the wall elements unless further additional measures are taken to achieve this.

Furthermore it is disadvantageous that the tongue and groove connections cannot be regarded as detachable connections which permit the respective assembly to be assembled and dismantled several times or even frequently. This disadvantage not only relates to the expenditure on labour which is necessary but also to the wear on the material which arises in the region of the connections.

Another disadvantage is that tongues and grooves of rectangular cross-section can be simply assembled without danger of damage to the edges only if the wall elements are kept in each case in a quite specific position during assembly. As soon as any twisting takes place a correspondingly greater force is required for assembly and damage may occur to the edges of the grooves and tongues.

SUMMARY OF THE INVENTION

It is an object of the invention to develop an assembly such as that of the type stated at the outset so that assembly of the wall elements on the one hand is possible even for the laymen without expensive assembly with the aid of tools and on the other hand the tongue and groove connections can ensure water and pressure-tightness as well as a large inherent stability of the assembly even when the connections between the wall elements are constructed as detachable connections and frequent assembly and separation of the wall elements takes place.

According to the invention, there is provided an assembly comprising a plurality of individual wall elements, connection regions provided on adjacent ones of said wall elements and at which said individual wall elements are to be connected, a tongue of trapezoidal cross-section formed along a connection region of a first said wall element, a groove of trapezoidal cross section defined by a second said wall element, extending along a connection region of said second wall element and mating with said tongue and clamping means for holding said first and second wall elements together.

BRIEF DESCRIPTION OF THE DRAWINGS

The invention will now be described in greater detail, by way of example, with reference to the drawings, in which:

FIG. 1 shows a perspective partial view of two wall elements which are to be connected, in the form of an exploded diagram;

FIG. 2 shows the wall elements shown in FIG. 1 in assembled position;

FIG. 3 shows a perspective partial view of a further wall element which is to be connected with the two other wall elements;

FIG. 4 shows two wall elements having different distribution of the grooves and tongues in a view corresponding to FIG. 1;

FIG. 5 shows the wall elements shown in FIG. 4 in assembled position;

FIG. 6 shows a further embodiment of the tongue and groove connection between two wall elements;

FIG. 7 shows an assembly constructed as a cupboard in front view;

FIG. 8 shows a side view of the view according to FIG. 7;

FIG. 9 shows a view of two frame elements which are connected by means of a hinge;

FIG. 10 shows a view on to one of the frame elements according to FIG. 9 from a direction rotated by 90°;

FIGS. 11 and 12 show partial views of a wall element having a circular cross-section as seen, in each case, towards one of the two end surfaces and;

FIG. 13 shows a variation of the embodiment according to FIG. 6.

DESCRIPTION OF THE PREFERRED EMBODIMENTS

In a preferred embodiment of the invention, it is proposed that the tongues and grooves of an assembly comprising a number of wall elements connected by a tongue and groove connection should have substantially trapezoidal cross-section and be dimensioned so that the force applied by a clamping element connecting the wall elements is transmitted essentially between the flanks of the tongues and grooves and that the tongue and groove connections run across the entire connection.

If, in the past, clamping elements in the form of strips running around the assembly etc. were used, then force transmission only took place between the bottom of the groove and the tip of the tongue as a result of the rectangular cross-section of the grooves and tongues. A pressure acting between the flanks of the tongues and grooves could not be produced by the clamping elements so that the size of the friction present between the flanks was solely dependent on the accuracy of manufacture. On the other hand the transmission of the force applied by the clamping elements takes place in accordance with the invention at the flanks of the grooves and tongues so that a very large friction is present therebetween and this friction is maintained continuously.

As a result, the assembly constructed as above obtains an essentially larger stability and inherent rigidity. Since the tongue and groove connections extend over the entire connection region, i.e. is carried out in a continuous manner even at the corners for example, there is reliable pressure-tightness so that the assembly can be considered as water and air-tight. A reduced pressure can be maintained for a relatively long time.

Because of the cross-section shape of the tongues and grooves simple assembly is possible, since the wall elements do not have to be retained in a specific position with respect to each other. Thus there is no danger of damage to the grooves and tongues at their edges.

The clamping element can be constructed for example as a strap or turnbuckle, preferably using a clamping lever in each case, as a clamping screw arrangement, as a wedge lock or in some other manner. In any case this type of clamping element should be operable without tools. Assembling and dismantling the assembly thus does not create any difficulty for the layman.

In order to be able to assemble different types of wall elements within the framework of a mechanical assembly technique as desired, it is advisable in accordance with a further embodiment if, in the case of two wall elements which are to be connected together, the connection surface of one wall element has an even number of grooves and odd number of tongues or half-tongues while the connection surface of the other wall element has an odd number of grooves or half-grooves and an even number of tongues.

By half-tongues and half-grooves are meant tongues and grooves which only have half the cross-section in relation to the other tongues and grooves respectively. These are integrated, moreover, into the outer surfaces of the wall elements.

As a result, the wall elements are provided with connection regions, formed by the grooves and tongues, of equal width and in the same position respectively so that the outer and inner faces of the wall elements have a continuous surface with the surfaces of the connected wall elements fitting flush with each other.

In further refinement of the invention, provision is made for the cross-sections of at least the centre grooves and tongues in each case to be dimensioned so that a spacing remains between the bottom of the groove and the tip of the tongue when the flanks of the grooves and tongues are adjacent. The part of the cross-section of a groove formed by this spacing may contain a resilient seal which is compressed between the tip of the tongue and the bottom of the groove. As a result, the sealing action which can be achieved is further increased. If the flanks of the tongues and grooves and the bottom of the grooves which delimit that part of the groove which contains the seal, are rounded-off, then the seal is prevented from being crushed too greatly or being damaged. The tongue can in the region of its tip be smaller in width than the width of the groove at this height so that a small space is left directly adjacent the tip of the tongue and the compressed seal can spread out into this clearance. As a result, not only is the seal prevented from being crushed too greatly but the sealing area is also increased.

Usually, simple clamping of a resilient sealing strip is sufficient. However, it is also conceivable for at least one channel to be provided for injection of plastic sealing material or if necessary an adhesive. The channel opens into the part of the groove which remains free.

An extremely inherently stable assembly can be produced from only sidewall elements so that the open fixed side can be closed by means of an appropriate door or lid element. This is very useful for application of the invention especially in construction of furniture and containers.

In accordance with a further proposal for an assembly of five wall elements, it is the tongues and grooves of a first wall element which run along the entire edge region of a side surface thereof, and of the four wall elements connected to the side surface of the first wall element, two opposite wall elements have narrow sides provided with tongues and grooves designed to engage with the first wall element and the other two wall elements. The tongues of the two remaining and also opposite wall elements are provided in the edge region of their side surfaces and, between the tongues, corresponding grooves are provided.

As a result there is the advantage that the tongue and groove connections between those four wall elements, which are fixed to the first wall element, do not lie in the corner regions in which the necessary sealing effect would be substantially more difficult to ensure. The assembly is also substantially easier since the first wall element can serve as a basic element to which each of the other four wall elements can be attached separately and in succession. It is particularly advisable for this assembly to be capable of being assembled with only two clamping elements in the form of tension straps, which straps each run in a plane around the assembly in which the two wall elements provided only with tongues and grooves on the narrow sides lie. In this position, only two straps are needed to compress all of the groove and tongue connections in the respective connection directions.

A sixth wall element, constructed as a door can be fixed to the assembly with the aid of a hinge and can be dimensioned so that it covers the part of the strap running at this side of the door, whereby the straps can serve at the same time as a component of a magnetic lock.

With an even number of tongues and an odd number of grooves or half-grooves in the edge region of its side surface, the narrow sides of the wall element bordering this edge and running at right angles thereto have an odd number of tongues or half-tongues and an even number of grooves or vice versa.

This reciprocity is advantageous, particularly in a wall element which has tongues and grooves running in the edge region of a side surface because these tongues and grooves can merge favourably into the tongues and grooves running along the narrow sides. These transitions have the advantage among other things, that a positive undercut is present longitudinally of both groups of grooves and tongues. These transitions should run at an angle of 45° to the respective tongues and grooves.

The possible application of the proposed assembly is enlarged further if the assembly is constructed as a frame element which is peripherally continuous in one direction and if a continuous tongue and groove connection is arranged at least on one of the two opposite endfaces in the narrow sides of the frame element surrounding the frame opening.

If a tongue and groove connection is provided only in one of the two endfaces, then one frame element can be used for example as a fixed door or windowframe, while a second frame element can be constructed as the door or opening window element. These doors or windows are distinguished by their very special and high sealing capacity.

If the frame element is provided with a groove and tongue connection on both opposite endfaces then the second endface can be connected to a wall element which has grooves and tongues running in the edge region on one side surface in order to form an assembly, i.e. to form a container, a cupboard or a box for example, which can be closed by means of a door or lid. It is also possible however to place further frame elements having equal cross-sections on the end surfaces so as to be connected adjacent to each other in any desired number, for example in order to construct a duct, a pipe etc. Thus the frame element may have a rectangular or circular cross-section and possibly may also be assembled from individual wall elements connected in a peripheral direction by tongue and groove connections.

Furthermore it is advantageous for the tongue and groove connections to be developed in the form of a plug and socket system, more particularly in connection with frame elements whereby, of the two tongue and groove connections arranged respectively at opposite end surfaces of the narrow sides of the frame element, the tongues and grooves of one connection project with respect to the side surfaces of the frame element, while the tongues and grooves of the other connection are let into the narrow side so that the tongues and grooves of two adjacent frame elements interengage like plug-and-socket elements. Thus a mechanical assembly technique can be developed from the assemblies whereby it is also conceivable for at least one of the assemblies to be constructed as a frame element having two planes of connection inclined to each other at an angle in which the endfaces lie with the narrow sides having the tongues and grooves. Thus a bend can be made, for example, in a pipe or a shaft or duct.

The assembly or its wall elements can be manufactured from any desired material, eg. from wood, plastics, metal or concrete. However if necessary, insulating material may be used whereby the application of the invention is extended to refrigerators or large-area cooling systems or water-tight roof insulation constructions. The field of application can moreover encompass superstructures in vehicles, reduced pressure chambers and with the use of appropriately heat-resistant cladding also chimneys etc.

It is conceivable moreover to use grooves and tongues as prefabricated components and to place appropriate profiles, more particularly made of wood, plastics or metal, on to the individual wall elements as necessary in each particular case. More particularly, within the framework of prefabricated house building or the building of covered areas (halls, sheds, garages, hangars, etc.) from prefabricated components, the wall elements can be manufactured in a sandwich construction.

It is also in keeping with the framework of the invention to produce a wall unit made up of a number of individual wall elements, extending essentially only in one plane and covering a relatively large area, and to hold the individual wall elements together with an element effective in this clamping plane. The clamping element can be a tensioning strap or a tentering frame formed either completely or partially from rigid strips or bars tensioned in the clamped position.

Referring now to the drawings of the two wall elements shown in FIGS. 1 and 2, the wall element 20 has two main side surfaces (side faces) 21 and 22. Two grooves 23 run along one narrow side (edge face) and a tongue 24 extends between them. Two half-tongues 25 are formed adjacent the side surfaces 21 and 22 and merge at their outer faces into one of the side surfaces 21 or 22 and in each case have approximately half the cross-section of the tongue 24. In this embodiment, the grooves 23 and the tongues 24 as well as the half-tongues 25 run on the narrow side which borders it in this corner region.

The other wall element 26 also has two side surfaces 27 and 28. In the region of the side surface 27, two tongues 29 are located along one longitudinal edge of the wall element 26 and a groove 30 extends between these tongues 29.

Half-grooves 31 are located at the outside of the two tongues 29 and have approximately half the cross-section of the groove 30 and are matched in their arrangement and dimensioning to the half-tongues 25. The lower half-groove 31 actually only comprises a free space without any particular edge path being distinguishable.

The narrow side (edge face) of the wall element 26 which points upwards has a flat continuous path and merges into the side surface 21 of the wall element after the wall elements 20 and 26 have been put together.

The wall element 26 has two grooves 32 on the narrow side (edge face) pointing towards the front and a tongue 33 runs therebetween. A half-tongue 34 is connected in turn to the side surfaces 27 and 28.

In the corner region, the left-hald half-tongue 34 merges into the half-groove 31 which is present only theoretically while the tongue 33 is cut off at an angle in its upper part running approximately horizontally at the end so that the tip of the tongue 33 hits against the bottom of the groove 30 approximately at right angles. The same is true for meeting of the tip of the tongues 29 with the bottoms of the grooves 32. These transitions all run in the form of a slanted portion at an angle of 45°.

Similarly the base of the upper half-grooves 31 merges into the back of the half-tongue 34 at a right angle.

FIG. 2 makes it clear how the tongue and groove connections interengage in detail when the wall elements 26 and 27 are assembled. The grooves 32 at the narrow side of the wall element 26 merges into the grooves 23 at the adjacent narrow side of the wall element 20. The same is true for the transition of the half-tongues 25 into the half-tongues 34 and the transition of the tongues 24 into the tongues 33.

Furthermore it should be noted that the tongues 29 and the grooves 23 are matched in their dimensions with respect to each so that a part 35 of the cross-section in each case remains free between the tip of a tongue 29 and the bottom of a groove 23 into which part 35 a seal (not shown) here can be inserted.

All of the grooves and half-grooves, tongues and half-tongues each have an almost trapezoidal cross-section and are dimensioned so that a force compressing the wall elements 20 and 26 in the connection direction is transmitted essentially only to the groove flanks and tongue flanks. Only an insubstantial part of this force serves to compress the seals inserted into the cross-sectional part 35 in each case. However this does not have any effect on the force acting between the flanks of the tongues and grooves nor on the magnitude of the friction which can be achieved between the tongue and groove connections.

The force serving to compress the wall elements 20 and 26 in the direction of connection can be produced in a different manner. A wedge lock is provided for this in the embodiment according to FIGS. 1 and 2 and is formed by a closure element 36 which is bent like a hook on both sides and by two counter elements 37 which are also bent in hook shape, one of which is fixed to the side surface 21 of the wall element 20 and the other to the upper narrow side of the wall element 26. The hook-shaped parts of the counter elements 37 and the sides of the closure element 36 bent downwards in hook shape run in wedge shape towards each other at a certain angle so that the two wall elements 20 and 26 are compressed by pushing the closure element 36 on to the two counterparts 37.

It is clear without further description that the two wall elements 20 and 26 can be assembled with two other wall elements not shown here to form an enclosed rectangular frame, both end surfaces of which are open. A wall element 38 is suitable for covering such an end surface and is shown in FIG. 3. The latter has two side surfaces 39 and 40. In the entire region, continuous tongues 41 are constructed on the upper side surface 39 and form a groove 42 between them. On the outside a half-groove 43 is located while the free area bordering the inner tongue 41 theoretically fulfils the function of a half-groove because it is taken up by the half-tongue 34 of the wall element 26 and the half-tongue 25 of the wall element 20 if the wall element 38 is placed on to the end surface formed by the wall elements 20 and 26 and two other wall elements. The two tongues 41 then engage the two grooves 32 of the wall element 26 and the two grooves 23 of the wall element 20 while the groove 42 is filled up by the tongue 33 of the wall element 26 and the tongue 24 of the wall element 20.

Thus a tongue and groove connection running across the entire edge region is present between the wall element 38 and the adjacent wall elements 20 and 26 and the two wall elements which are not shown here, whereby pressing the wall element 38 against the remaining wall elements takes place with the aid of suitable clamping elements. A groove 44 constructed in the side surface 28 of the wall element 26 can be seen in FIGS. 1 and 2. In order to connect the wall elements, a clamping band 45 is placed into this groove 44 and encircles the wall element 26 and a wall element adjacent on the opposite side of the wall element 20 and thus the wall element 20 itself which is in this peripheral plane. This will be described in detail in conjunction with FIGS. 7 and 8.

Initially however the embodiment shown in FIGS. 4 and 5 will be described. One wall element 46 has two side surfaces 47 and 48. The front narrow side in FIGS. 4 and 5 of the wall element 46 has two tongues 49 and a groove 50 runs therebetween. A half-groove 51 is adjacent to the side surfaces 47 and 48.

Two grooves 53 are located on the narrow side of the wall element 46 facing an adjacent wall element 52 and a tongue 54 extends between these. Two half-tongues 55 are provided on this narrow side adjacent the side surfaces 47 and 48 of the wall element 46. The two grooves 53 merge into the two tongues 49 in a transition region between the two narrow sides while the tongue 54 merges into the groove 50. Accordingly, a transition between the half-tongues 55 and the half-grooves 51 is present.

The wall element 52 has two side surfaces 56 and 57. The upper narrow side of the wall element 52 has a continuously flat path and merges into the side surface 47 of the wall element 46 when this is joined together with the wall element 52. Two tongues 58 between which a groove 59 is formed run along the upper longitudinal edge of the wall element 52 in the edge region of the side surface 56. Half-grooves 60 are again attached to the outside.

The half-tongues 55 of the wall element 46 engage into the latter while the tongue 45 engages into the groove 59. In the case of wall elements 46 and 52 connected together, the tongues 58 lie accordingly in the grooves 53. As can be seen from FIG. 5 part 61 of the cross-section remains free between the tip of the tongue and the bottom of the groove a seal not shown here being inserted into these parts 61.

The tongues 58, the groove 59 and the half-grooves 60 are bent at right angles to follow the narrow side of the wall element 52 extending downwards and are continued along this narrow side.

As the different embodiments in accordance with FIGS. 1 to 3 on the one hand and FIGS. 4 and 5 on the other hand make apparent, distribution of grooves and half-grooves or tongues and half-tongues can vary in the respective connection regions. The transition points in the corner regions can be arranged differently and constructed differently.

In the embodiment according to FIGS. 4 and 5, compression of the wall elements 46 and 52 takes place with the aid of clamping locks 62 one of which can be seen in FIG. 5.

A further embodiment of the invention is shown in FIG. 6. A wall element 63 has two side surfaces 64 and 65. A profile 66 is let into the side surface 65 as far as corresponds to the thickness of its baseplate. The profile 66 has two tongues 67 and a groove 68 extends between these.

In contrast to the embodiments described previously, the tongues 67 only have a trapezoidal cross-section in their first cross-sectional part starting from the baseplate of the profile 66, while the cross-sectional part of the tongue 67 which is located towards the tip of the tongue is triangular and permits the tip of the tongue to form a ridge. The groove 68 has a circularly rounded cross-section.

A wall element 69 adjacent the wall element 63 and at right angles thereto has two side surfaces 70 and 71. A profile 72 is let into the narrow side facing the wall element 63 and forms two grooves 73, a tongue 74 extending between them. A half-tongue 75 is connected to the grooves 73 towards the outsides of the profile 72.

The grooves 73 do not have any uniformly trapezoidal cross-section either but are rounded off in the region of their base in cross-section. The tongue 74 which lies at the centre has an approximately triangular and pointed cross-section in the region of the tip of the tongue so that the tip of the tongue has a longitudinal edge. Moreover, the flanks of the tongues 74 are matched to the circular shape of the path of the grooves.

A sealing strip 76 is placed into the groove 68 and into the grooves 73 and has a circular cross-section in the unloaded state. Since the tips of the tongues 67 and 74 are edge-shaped and since a free area is available in a cross-wise direction to the tongue or groove flanks which are adjacent respectively, the sealing strips 76 can spread out into these if they are compressed by the backs of the tongues into their grooves 68 or 73. As a result, an increase in the sealing area is produced and sealing is extremely reliable and can be subject to high loads. In this case the forces to be transmitted during compression of the wall elements 63 and 69 are transmitted only between the outer flanks of the tongues 67 and the flanks of the half-tongues 75 or of the grooves 73 adjacent them.

In FIG. 6 moreover the wall elements 63 and 69 are drawn to show the channels 77 penetrating the grooves 68 and 73 in order to indicate that plastic or even hardenable sealing and/or glueing material can be injected into the groove area which had been taken up by the sealing strip 76 and this material is distributed evenly by means of effervescence. The profiles 66 and 72 can comprise any desired material, more particularly plastics or metal such as aluminum. The use of prefabricated profiles will in many cases lead to simplification and reduction in cost of manufacture. A groove profile 78 is let into the side surface 64 of the wall element 63 into which a strap 79 is placed which encompasses the wall elements 63 and 69 and sometimes at least a further wall element. The groove profile 78 is covered by means of a covering strip 80. FIG. 13 shows a modification in relation to this inasmuch as a profile 100 is now used instead of the inset profile 66 which profile 100 is placed flat on to the side surface 65 and is held in a correspondingly dimensioned groove by means of a tongue 101 constructed on the abutting side. This type of fixing leads to a smaller weakening of the cross-section of the wall element 63 and moreover is simpler and cheaper since the tongue 101 can be kept in its groove with the aid of appropriate undercutting of the cross-section and by means of locking action.

Since, up till now, different possibilities of developing and arranging the tongue and groove connections were described by way of individual wall elements, in the following it will be described how assemblies of any desired shape can be put together by means of these wall elements. An assembly in the shape of a cupboard is shown in FIGS. 7 and 8. The wall element, the construction of which was described in the context of the description of FIG. 3, serves as the rear side. Two wall elements 26 are used as side walls while two wall elements 20 serve as a base element and as a covering plate. The construction of the wall elements 20 and 26 was described by way of FIGS. 1 and 2. These five wall elements are put together to form an assembly which can be held together by means of only two tension bands 45 which are inserted into the grooves 44. However, in addition or alternatively, clamping locks 62 or wedge locks formed from a closure element 36 and two counter elements 37 can be used.

A wall element 82 serving as a door is fixed to one wall element 26 by means of hinges 81. The said wall element 26 is provided in the same manner as the wall element 38 with tongues and grooves running round the inner side surface and forming a tongue and groove connection which is enclosed on all sides with the tongues and grooves which run round the narrow sides of the wall elements 20 and 26 so that a water-tight and pressure-tight closure is also ensured in the region of the wall element 82. Thus it is of particular advantage that the truncated conical shape of the tongue and groove connections makes a pivoting movement of the wall element 82 possible during opening and closing without difficulty. In advantageous manner moreover, solely by exchanging the wall element 26 provided with the hinges 81 for the other wall element 26 and by appropriate changing round of these wall elements including the wall element 82, the stop side can be exchanged so that the wall element 82 can be opened in the opposite pivoting direction.

However, the narrow sides of the wall elements 20 and 26 facing the wall element 82 and the inside of the wall element 82 can be constructed as smooth flat surfaces if a particularly good pressure-tight fit is not necessary. Magnets 83 let into the edge region in the inside of the wall element 82 can then form a magnetic catch in co-operation with the tension straps 45.

A next embodiment of the invention is shown in FIGS. 9 and 10 in which frame elements 84 and 85 are used which have a continuous periphery. The frame element 84 has tongues and grooves running along the small sides on one endface 86 in a form and arrangement which can correspond to that according to FIGS. 1 to 6. While the tongues and grooves 87 are let into the end surface 86 so that they terminate at the end surface 86 in flush manner, tongues and grooves 89 are so arranged at the opposite end 88 that they project from the end surface 88.

The frame element 85 connected to the frame element 84 at one side with the aid of hinge 90 has tongues and grooves 92 at its endface which are inset into the frame element 85 so that they form a type of socket member into which the tongues and grooves 89 of the frame element 84 can engage like a plug element. On the opposite end surface 93 of the frame element 85 are constructed tongues and grooves 94 again in the form of a plug element so that another frame element can be set on it. The frame elements 84 and 85 are kept together at the side opposite the hinge 90 with the aid of a clamping device 62. The end surfaces 86 and 88 of the frame element 84 lie in planes which run at an angle to each other so that for example a shaft or piping formed from these frame elements may have a bend as required.

For example a pane of glass not shown here can be inserted into the frame element 85 whereby the tongues and grooves 94 can be dispensed and the frame element 85 can serve as a window pane. FIG. 10 shows a view of the frame element 85 which is rectangular in cross-section and shown towards the end surface 93.

FIGS. 11 and 12 show part of a tubular wall element 95 constructed so as to be circular in cross-section, one end surface 96 of which is provided with tongues and grooves 97 on its narrow sides. (FIG. 11). The opposite end surface 98 has tongues and grooves 99 which are offset and arranged in such a way with respect to the tongues and grooves 97 that several wall elements 95, each having a side constructed as a plug side and a sign constructed as a socket side may be added on.

It will be understood that the above description of the present invention is susceptible to various modification changes and adaptations.

What is claimed is:

1. In a wall assembly formed of a plurality of wall elements each having opposite side faces and edge faces interconnecting said side faces; first connecting elements formed along peripheral zones of at least some of the wall elements; second connecting elements formed along peripheral zones of at least some of the wall elements; adjoining wall elements being joined together by a groove-and-tongue connection each formed of one of the first connecting elements and one of the second connecting elements; one of the first and second connecting elements forming each groove-and-tongue connection comprising a tongue formed on one wall element and the other of the first and second connecting elements forming each groove-and-tongue connection comprising a grooved part formed on another, adjoining wall element; the tongue and the grooved part of each groove-and-tongue connection being in an interfitting relationship with one another; the improvement wherein (a) a first one of said wall elements carries one of said first connecting elements extending on a side face thereof and one of said second connecting elements extending on an edge face thereof; said first connecting element of said first wall element being at an angle other than zero with respect to and merging into said second connecting element of said first wall element in a corner zone of said first wall element; further wherein the tongue constituting one of said connecting elements of said first wall element has a slanted end portion of 45°; said end portion forming a transition into the grooved part constituting the other of said connecting elements of said first wall element;

(b) a second one of said wall elements carries two of said first connecting elements on one side face thereof; said two first connecting elements of said second wall element meeting in a corner zone of said second wall element;

(c) a third one of said wall elements carries two of said second connecting elements on two adjoining edge faces thereof;

(d) said first, second and third wall elements are in an adjoining relationship with one another;

(e) said first connecting element of said first wall element and one of said two second connecting elements of said third wall element together form a first one of said groove-and-tongue connections;

(f) said second connecting element of said first wall element and one of said two first connecting elements of said second wall element together form a second one of said groove-and-tongue connections; and (g) the other of said two first connecting elements of said second wall element and the other of said two second connecting elements of said third wall element together form a third one of said groove-and-tongue connections.

2. An assembly as defined in claim 1, wherein one connecting element of at least some of the groove-and-tongue connections each have two flanking tongues and at least one additional tongue situated between the flanking tongues and further wherein the other connecting element of said at least some of the groove-and-tongue connections each have two flanking grooved parts and at least one additional grooved part situated between the flanking grooved parts; and further wherein each flanking tongue and each flanking grooved part has one half the width of the respective said additional tongue and grooved part.

3. An assembly as defined in claim 1, wherein the tongue and the grooved part forming any said groove-and-tongue connection define together an internal space coextensive with the groove-and-tongue connection.

4. An assembly as defined in claim 1, wherein each said groove-and-tongue connection has a plurality of said tongues and a plurality of said grooved parts.

5. An assembly as defined in claim 3, further comprising a resilient seal located in said space.

6. An assembly as defined in claim 5, wherein parts of said tongue and said grooved portions defining said space are rounded off.

7. An assembly as defined in claim 6, wherein said tongue is narrower in the region of its tip than the width of said grooved part at this height.

8. An assembly as defined in claim 6, wherein said tip of said tongue has a pointed wedge-shaped cross section.

9. An assembly as defined in claim 6, further comprising means defining at least one channel for injection of plastics sealing material or an adhesive, said channel opening into said space.

10. An assembly as defined in claim 1, further comprising clamping means having a clamping lever lock engaging between two of said wall elements to be connected.

11. An assembly as defined in claim 1, further comprising clamping means having a clamping hook lock engaging between two of said wall elements to be connected.

12. An assembly as defined in claim 1, further comprising clamping means having a wedge lock engaging between two of said wall elements to be connected.

13. An assembly as defined in claim 4, wherein, for connection of said wall elements at right angles, said tongues and grooved of one said wall element run along the narrow edge and said tongues and grooved of the other said wall element run along an edge region of one side of said other wall element.

14. An assembly as defined in claim 1 further comprising two clamping elements in the form of tension straps each running in a plane around the assembly.

15. An assembly as defined in claim 1, further comprising a hinged connection for fixing a wall element at one side to one end surface of another wall element so as to be pivotable; and a clamping element between the pivotable wall element and the respective other wall element acting at the opposite side of said wall element to the hinged connection to provide for all of the tongue and groove connections running along the narrow side to be pressed against each other.

16. An assembly as defined in claim 4, wherein the tongues and grooved parts assigned to a wall element comprise a component of a prefabricated profile having a tongue on the rear side of the profile engaging into a corresponding grooved part in the wall element with a rear side abutting a corresponding side surface of the wall element in flush manner.

17. A wall assembly as defined in claim 1, wherein said tongues and said grooved parts each have a substantially trapezoidal cross section.

* * * * *